United States Patent
Chang et al.

(10) Patent No.: US 11,814,017 B2
(45) Date of Patent: Nov. 14, 2023

(54) WINDSHIELD WIPER

(71) Applicant: Danyang UPC Auto Parts Co., Ltd., Jiangsu (CN)

(72) Inventors: Che-Wei Chang, Jiangsu (CN); Cheng-Kai Yang, Jiangsu (CN)

(73) Assignee: DANYANG UPC AUTO PARTS CO., LTD.

( * ) Notice: Subject to any disclaimer, the term of this patent is extended or adjusted under 35 U.S.C. 154(b) by 0 days.

(21) Appl. No.: 17/558,940

(22) Filed: Dec. 22, 2021

(65) Prior Publication Data

US 2022/0203937 A1    Jun. 30, 2022

(30) Foreign Application Priority Data

Dec. 30, 2020 (CN) .......................... 202023338231.3

(51) Int. Cl.
*B60S 1/34* (2006.01)

(52) U.S. Cl.
CPC .......... *B60S 1/3429* (2013.01); *B60S 1/3431* (2013.01); *B60S 1/3436* (2013.01); *B60S 1/3447* (2013.01)

(58) Field of Classification Search
CPC .... B60S 1/3463; B60S 1/3489; B60S 1/3411; B60S 1/3889; B60S 1/3806; B60S 1/3429; B60S 1/3431; B60S 1/3436; B60S 1/3447
USPC .......................... 15/250.32, 250.454, 250.453
See application file for complete search history.

(56) References Cited

U.S. PATENT DOCUMENTS

| | | | | |
|---|---|---|---|---|
| 8,544,139 | B2* | 10/2013 | Chien | B60S 1/381 |
| | | | | 15/250.454 |
| 2001/0034921 | A1* | 11/2001 | Kang | B60S 1/3801 |
| | | | | 15/250.451 |
| 2008/0052865 | A1* | 3/2008 | Chiang | B60S 1/38 |
| | | | | 15/250.43 |
| 2017/0057465 | A1 | 3/2017 | Houssat et al. | |
| 2019/0275989 | A1* | 9/2019 | Lee | B60S 1/3801 |

FOREIGN PATENT DOCUMENTS

| | | |
|---|---|---|
| DE | 102008000708 A1 | 9/2009 |
| KR | 20130031645 A * | 3/2013 |

OTHER PUBLICATIONS

Search Report dated May 25, 2022 of the corresponding European patent application No. EP21216221.8.

* cited by examiner

*Primary Examiner* — Katina N. Henson

(74) *Attorney, Agent, or Firm* — Chun-Ming Shih; HDLS IPR SERVICES

(57) ABSTRACT

The present disclosure relates to a windshield wiper, having a latch seat (10), an elastic arm (20), a scraper (40) and a blocking member (50). The elastic arm (20) is connected to the latch seat (10) and includes an opening slot (21) formed at one end thereof. The elastic arm (20) includes a top surface (22) and a bottom surface (23). The scraper (40) is attached to the bottom surface (23) of the elastic arm (20). The blocking member (50) includes a substrate (51) attached to the top surface (22) and having a side blocking member (52) penetrating through the opening slot (21) and blocking the scraper (21) along a longitudinal direction of the elastic arm (20). Accordingly, the windshield wiper is facilitated for assembly, and the scraper may be secured effectively.

5 Claims, 5 Drawing Sheets

WINDSHIELD WIPER

BACKGROUND OF THE DISCLOSURE

Technical Field

The technical field of the present disclosure relates to a windshield wiper, and in particular, to a windshield wiper with a scraper facilitated for assembly and securement.

Description of Related Art

A related-art windshield wiper typically at least includes an elastic strip, a scraper, and a latch seat. The scraper is installed on one side of the elastic strip, and the latch seat is installed on the other side of the elastic strip. The latch seat is used for latching the wiper arm, such that when the wiper arm presses the windshield wiper onto the glass, the elastic strip is able to utilizes its elasticity to allow the scraper to match with the contour of the glass surface while pressing the scraper thereon.

During the assembly of a windshield wiper, generally, the latch seat is riveted to the elastic strip, followed by mounting the scraper to the latch seat. However, during the mounting of the scraper, it is likely to interfere with the latch seat such that the assembly process cannot be performed easily. In addition, the scraper tends to wobble after a long period of time of use. According, there is a need to overcome such drawback and to allow the windshield wiper to be assembled easily and secured properly in a more effective way.

In view of the above, the inventor seeks to overcome the aforementioned drawbacks associated with the aforementioned related art and aims to provide an effective solution through extensive researches along with utilization of academic principles and knowledge.

SUMMARY OF THE DISCLOSURE

The main objective of the present disclosure is to provide a windshield wiper with a scraper facilitated for installation and securement.

To archive the aforementioned objective, the present disclosure provides a windshield wiper, including a latch seat, at least one elastic arm, a scraper and at least one blocking member. The elastic arm is connected to the latch seat and includes an opening slot formed at one end of the elastic arm. The elastic arm includes a top surface and a bottom surface. The scraper is attached to the bottom surface of the elastic arm. The blocking member includes a substrate. the substrate is attached to the top surface and includes a side blocking member. The side blocking member penetrates through the opening slot and blocks the scraper along a longitudinal direction of the elastic arm.

The present disclosure is able to achieve the following effects. Through the use of the positioning slab and the positioning slot, the blocking member is secured on the elastic arm. Through the use of the clamp on each frame, the elastic arm is retained inside the channel without disengaging from the connecting strip. By installing the guiding shield to cover the top surface of each elastic arm, it is able to prevent rainwater from infiltrating into the elastic arm inside the connecting strip.

DETAILED DESCRIPTION OF THE EMBODIMENTS

Figure 1:
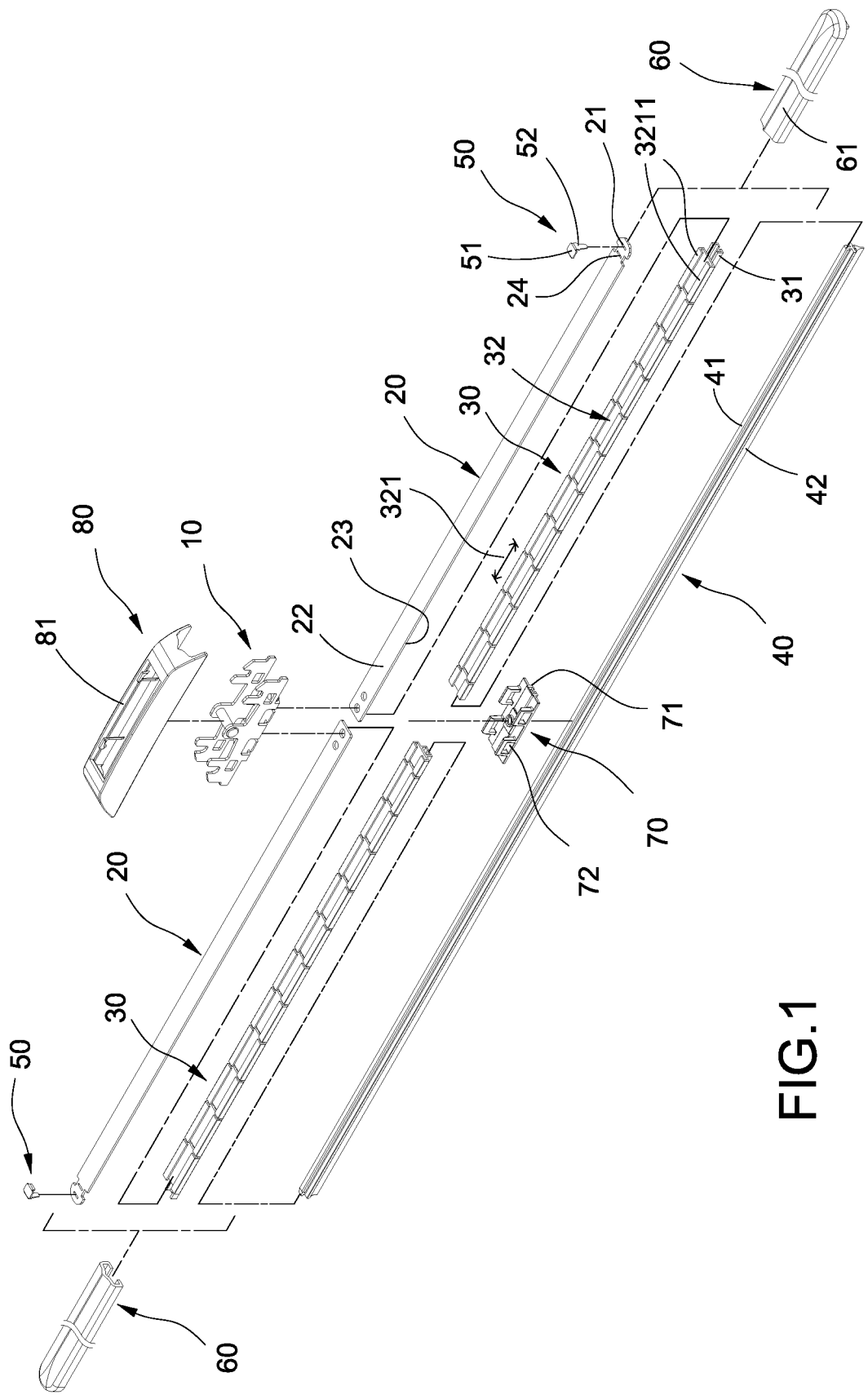
FIG. 1 is an exploded perspective view of the present disclosure.

The technical contents of the present disclosure will become apparent with the detailed description of embodiments accompanied with the illustration of related drawings as follows. It is intended that the embodiments and drawings disclosed herein are to be considered illustrative rather than restrictive.

The present disclosure provides a windshield wiper, used to scrape off rainwater on a windshield. As shown in FIG. 1 to FIG. 5, the windshield wiper includes a latch seat 10, an elastic arm 20 connected to the latch seat 10, a scraper 40, a connecting strip 30 connected between the elastic arm and the scraper 40, and a blocking member 50 arranged on the elastic arm 20. In addition, the latch seat 10 is connected to the elastic arm 20 for latching a windshield wiper arm (not shown in the drawings).

The present disclosure is not limited to any specific position where the elastic arm 20 is connected to the latch seat 10. In this exemplary embodiment, the latch seat 10 is connected to one end of the elastic arm 20 and the latch seat 10 is connected to a pair of elastic arms 20. As shown in FIG. 1, each elastic arm 20 penetrates and connects to a corresponding connecting strip 30 respectively. The scraper 40 penetrates and connects to each connecting strip 30 to be connected to each elastic arm 20. Another end of each elastic arm 20 includes a blocking member 50 arranged thereon for blocking the connecting strip 30 and the scraper 40.

Figure 2:
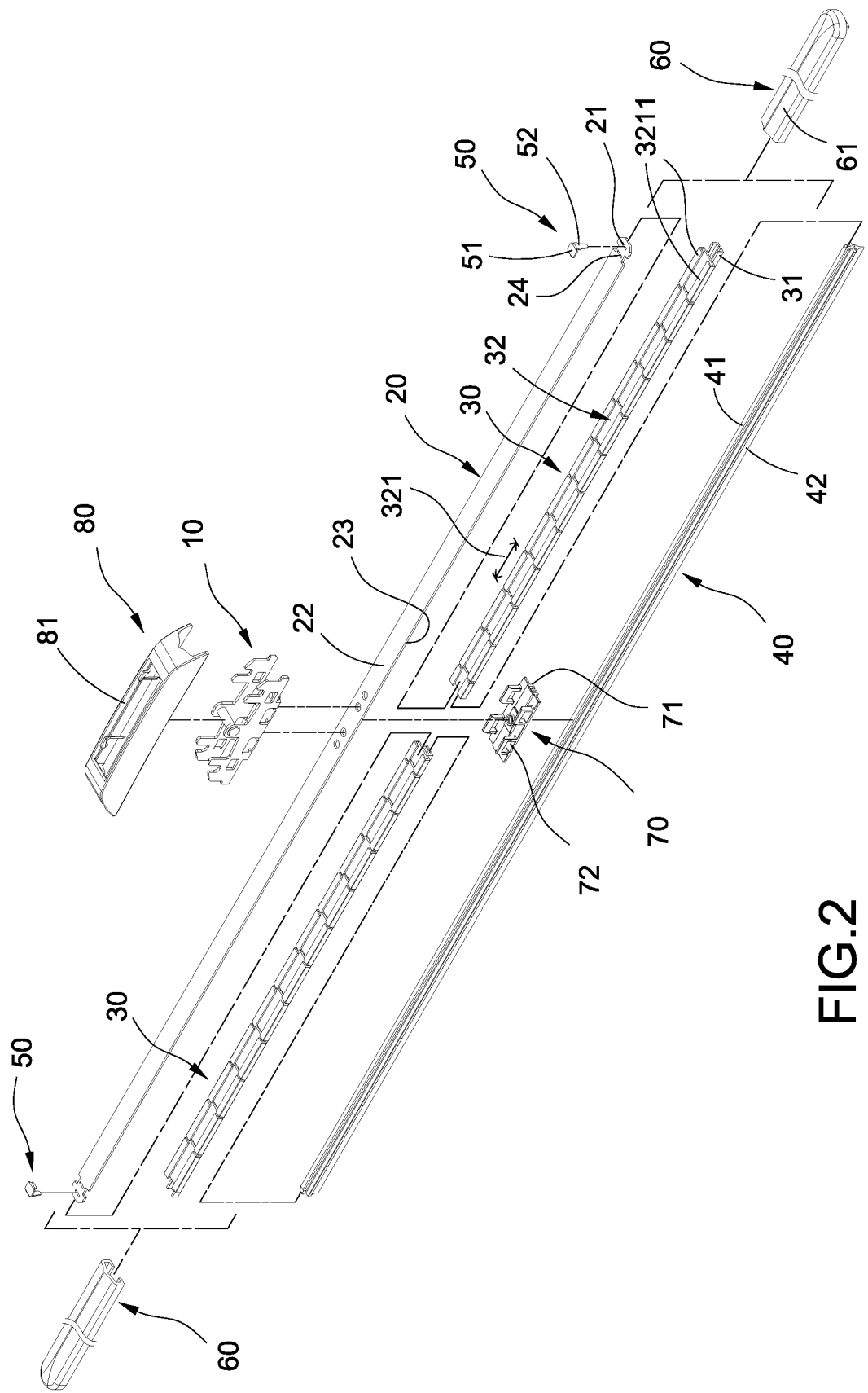
FIG. 2 is an exploded perspective view according to another exemplary embodiment of the present disclosure.

Nevertheless, the present disclosure is not limited to such configuration only. For example, as shown in FIG. 2, the latch seat 10 may also be connected to the center of one single elastic arm 20, the pair connecting strips 30 may be mounted to the elastic arm 20 from two ends of the elastic arm 20 to be positioned at two opposite sides of the latch seat 10, and the two ends of the elastic arm 20 may further include a blocking member 50 arranged thereon respectively.

In this exemplary embodiment, the structural characteristics of the two elastic arms 20 are identical to each other. Accordingly, only one of the elastic arms 20 is described, and the other elastic arm 20 is omitted for the purpose of concise description. The elastic arm 20 is an elongated metal sheet. The two surfaces of the elastic arm 20 refer to a top surface 22 and a bottom surface 23. One end of the elastic arm 20 is connected to the latch seat 10, and another end thereof includes an opening slot 21 formed thereon. To be more specific, each elastic arm 20 has an arched shape, and the two elastic arms 20 have shapes matching with each other such that the overall shape of the windshield wiper is also of an arched shape. In this exemplary embodiment, each elastic arm 20 is riveted to the latch seat 10. However, the present disclosure is not limited to such configuration only. For example, the elastic arm 20 may also be fastened, mounted, or latched to the latch seat 10.

In this exemplary embodiment, the structural characteristics of the two connecting strips 30 are identical to each other. Accordingly, only one of the connecting strips 30 is described, and the other connecting strip 30 is omitted for the purpose of concise description. One side of the connecting strip 30 includes a lower guiding track 31. The lower guiding track 31 is extended along the longitudinal direction of the connecting strip 30, and the other side of the connecting strip 30, which is opposite from the lower guiding track 31, covers the bottom surface 23 of the corresponding elastic arm 20. To be more specific, the connecting strip 30 is an elastic and elongated member formed by an elastic material. The connecting strip 30 includes a channel 32 provided to allow the corresponding elastic arm 20 to penetrate therethrough. Each channel 32 includes a plurality section of frames 321 connected to each other, and the elastic arm 20 sequentially penetrates through each frame 321. Accordingly, when the elastic arm 20 is subject to an external force to generate a deformation, the gap between the frames 321 allows the channel 32 to deform along with the elastic arm 20 such that inference to the action of the elastic arm 20 may be prevented. In this exemplary embodiment, each frame 321 includes a pair of clamps 3211, and the clamps 3211 respectively secure the two side edges of the elastic arm 20. However, the present disclosure is not limited to such configuration. For example, the frame 321 may also be rectangular frame provided to allow the elastic arm 20 to penetrate therethrough.

One side of the scraper 40 includes an upper guiding track 41. the upper guiding track is extended along the longitudinal direction of the scraper 40 and penetrates and connects to each lower guiding track 31. To be more specific, the scraper 40 is of an elongated shape, and the scraper 40 includes a blade portion 42 formed on another side of the upper guiding track 41. The blade portion 42 is used to scrape off rainwater on the windshield.

Figure 3:
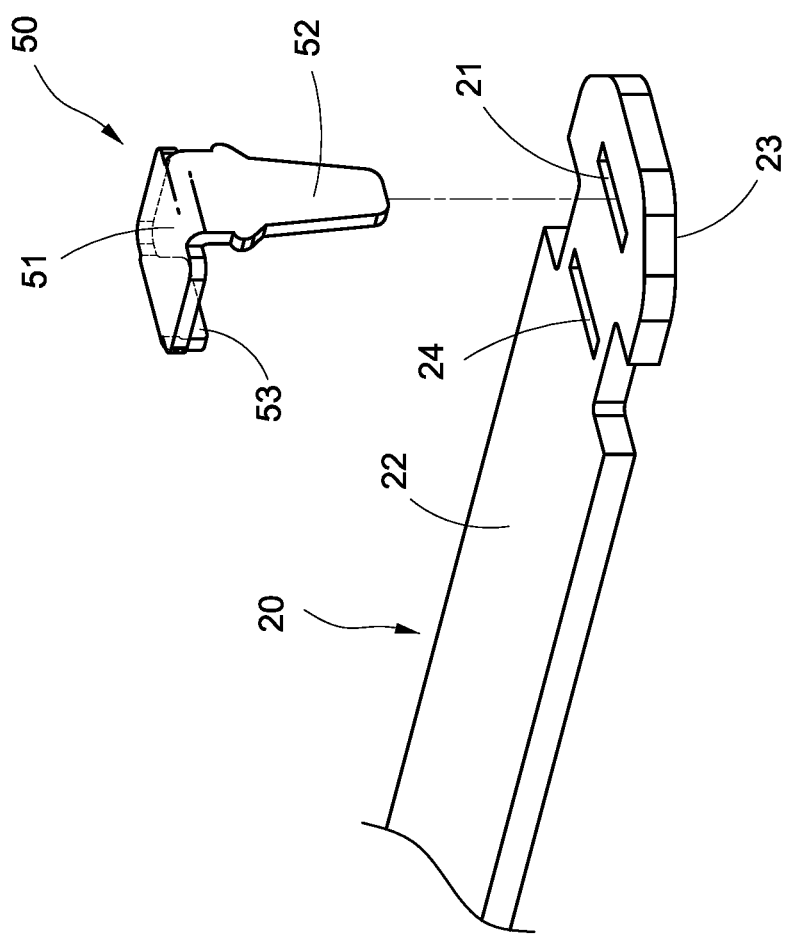
FIG. 3 is an exploded perspective view showing the elastic arm and blocking member of the present disclosure.

In this exemplary embodiment, the structural characteristics of the two blocking members 50 are identical to each other. Accordingly, only one of the blocking members 50 is described, and the other blocking member 50 is omitted for the purpose of concise description. In this exemplary embodiment, the blocking member 50 is made of a bending metal sheet. To be more specific, the blocking member 50 includes a substrate 51. The substrate 51 includes a side blocking portion 52 extended vertically. The substrate 51 is attached to the top surface 22 of the corresponding elastic arm 20. The side blocking portion 52 penetrates and connects to the corresponding opening slot 21 to penetrate through the elastic arm 20. Accordingly, it is able to block the corresponding connecting strip 30 and the scraper 40 along the longitudinal direction of the elastic arm 20 to prevent the disengagement of connecting strip 30 and scraper 40. To more specific, as shown in FIG. 3, the blocking member 50 is made of a bending metal sheet. In addition, the substrate 51 includes a positioning slab 53 protrusively disposed on another side opposite to the side blocking portion 52. The elastic arm 20 includes a positioning slot 24 formed thereon. The positioning slab 53 is inserted into the positioning slot 24 to secure the blocking member 50 on the elastic arm 20.

Figure 4:
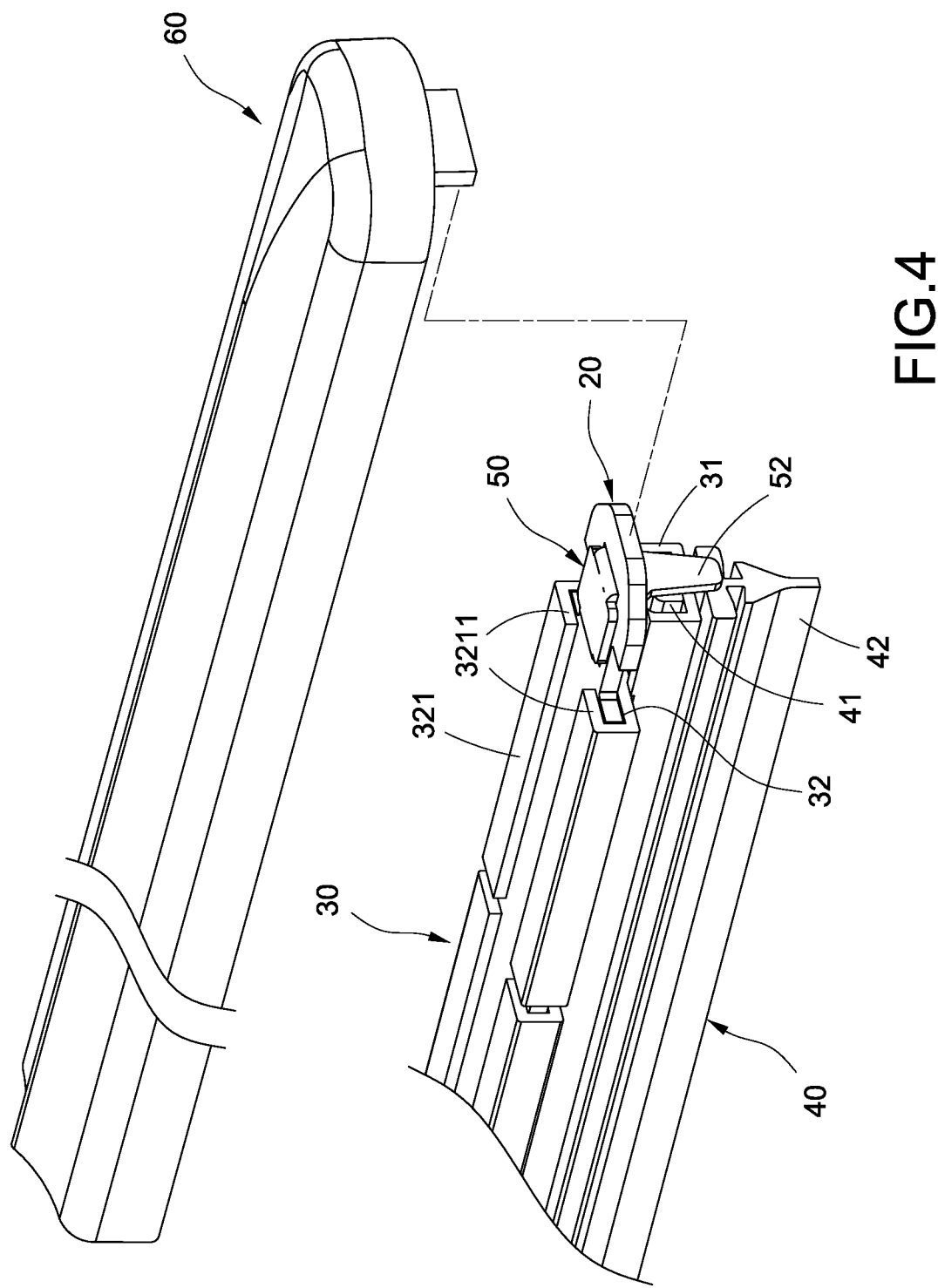
FIG. 4 is a perspective view of the present disclosure.
Figure 5:
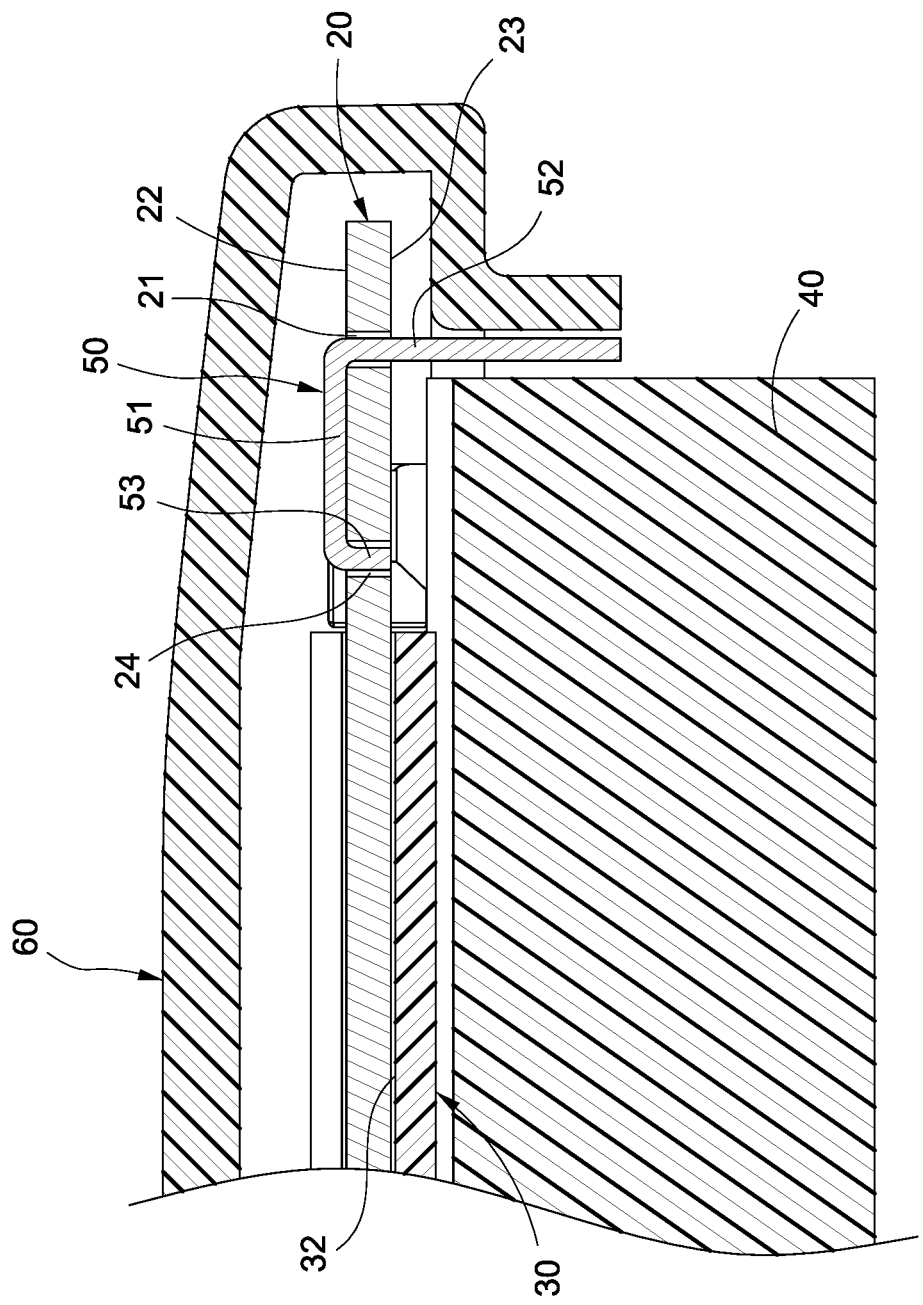
FIG. 5 is a cross sectional view of the present disclosure.

In addition, please refer to FIG. 1, FIG. 4, and FIG. 5. The windshield wiper of the present disclosure further includes a pair of guiding shields 60 made of a plastic material and in the form of elongated shields, and a ridge portion 61 is protruded from the outer side of the guiding shield 60 and extended along the longitudinal direction of the guiding shield 60. Each guiding shield 60 covers the top surface 22 of each elastic arm 20 to guide the airflow passing through the surface of the windshield wiper and to cover the blocking member 50 at the same time to prevent the blocking member 50 from disengaging from the elastic arm 20. Furthermore, each guiding shield 60 covers the channel 32 of the corresponding connecting strip 30 to prevent rainwater from infiltrating into the elastic arm 20 inside the channel 32.

To be more specific, please refer to FIG. 1 again. The windshield wiper of the present disclosure further includes a retainer 70. The retainer 70 is connected between the connecting strips 30. In this exemplary embodiment, the two side edges of the retainer 70 include a plurality of locking hooks 72 protruded therefrom for buckling to the latch seat 10. The two elastic arms 20 are connected to the same side of the latch seat 10, and the end portions of the two elastic arms 20 connected to the latch seat 10 are separated from each other to be clamped between the retainer 70 and the latch seat 10. Accordingly, the retainer may prevent rainwater residue left between the two connecting strips 30 or between the end portions of the two elastic arms 20. Furthermore, the retainer 70 includes a connecting section 71. The shape of the connecting section 71 is continuous related to the outer shapes of the pair of lower guiding tracks 31 to be connected to the lower guiding track 31, thereby allowing the upper guiding track 41 to be sheathed in one of the lower guiding track 31 and to be further sheathed to another lower guiding track 31 via the connecting section 71.

In addition, the retainer 70 at the lower portion of the latch seat 10 has an outer shape continuous related to the outer shape of the guiding shield 60, thereby allowing the retainer 70 to be connected to the opening of the guiding shields 60 between the guiding shields 60. The windshield wiper of the present disclosure further includes a protective cover 80. The protective cover 80 covers the latch seat 10 and the end portion of each guiding shield 60 connected to the latch seat 10, thereby allowing the two guiding shields 60 to be connected in a streamline manner. Furthermore, the protective cover includes an opening 81 provided to allow the windshield wiper arm to penetrate into such opening for bucking to the latch seat 10.

It shall be noted that the assembly method of the present disclosure is further described in the following. First, the latch seat 10 is riveted to the two elastic arms 20 for securement respectively. Next, the channel 32 of each connecting strip 30 is mounted to the corresponding elastic arm 20, and the retainer 70 is latched to the latch seat 10. Then, the upper guiding track 41 of the scraper 40 is inserted into the lower guiding track 31 of one of the connecting strips 30, and passes through the connecting section 71 of the retainer 70, followed by mounting to another lower guiding track 31. Furthermore, the opening slot 21 of each elastic arm 20 penetrates into the blocking member 50 respectively, allowing the blocking member 50 to be locked and secured with the corresponding elastic arm 20 to prevent the disengagement of the connecting strip 30 and the scraper 40. Next, the two guiding shields 60 are adapted to sheathe the corresponding elastic arm 20 and the connecting strip 30 respectively. Finally, the protective cover 80 is covered onto the latch seat 10, and the assembly of the windshield wiper of the present disclosure is then complete.

It can be understood that the present invention may have other various types of embodiments, and a person skilled in the art in the technical field of the present disclosure may made various corresponding changes and modifications based on the present disclosure without deviating from the principle and substantial elements of the present disclosure. Nevertheless, such corresponding changes and modifications shall be considered to be within the claimed scope of the present disclosure.

What is claimed is:

1. A windshield wiper, comprising:
   a latch seat (10);

a pair of elastic arms (20), having two adjacent ends connected to the latch seat (10) and each comprising an opening slot (21) disposed on a distal end thereof, a top surface (22) and a bottom surface (23);

a pair of connecting strips (30), adapted to sheathe the elastic arms (20), respectively, and each comprising a lower guiding track (31) disposed on one side opposite to another side covering the elastic arm (20), wherein two lower guiding tracks (31) are extended along a longitudinal direction of the connecting strips (30);

a scraper (40), comprising an upper guiding track (41) disposed on the one side thereof; and a retainer (70), comprising a connecting section (71) and a plurality of locking hooks (72) protruding from two side edges thereof, adapted to buckle the latch seat (10) by the locking hooks (72), the connecting strips (30) respectively abutting two ends of the retainer (70), wherein an outer shape of the connecting section (71) is continuous related to an outer shape of each lower guiding track (31) to allow the upper guiding track (41) to be sequentially sheathed in the lower guiding tracks (31) via the connecting section (71);

a pair of blocking members (50), each comprising a substrate (51) attached to the top surface (22) and a side blocking member (52), the side blocking member (52) penetrating through the opening slot (21) and extending downwardly to stop the connecting strip (30) and the scraper (40) moving along the longitudinal direction by blocking at ends of the lower guiding track (31) and the upper guiding track (41).

2. The windshield wiper according to claim 1, wherein the substrate (51) comprises a positioning slab (53) protrusively disposed on another side thereof opposite to the side blocking portion (52), the elastic arm (20) comprises a positioning slot (24) disposed thereon, and the positioning slab (53) is inserted in the positioning slot (24).

3. The windshield wiper according to claim 1, wherein the connecting strip (30) comprises a channel (32) disposed thereon, and the elastic arm (20) penetrates inside the channel (32).

4. The windshield wiper according to claim 1, further comprising: a pair of guiding shields (60), each guiding shield covering each elastic arm (20) and covering each channel (32) and each blocking member (50) correspondingly.

5. The windshield wiper according to claim 4, further comprising: a protective cover (80), the protective cover (80) covering the latch seat (10) and an end portion of each guiding shield (60) connected to the latch seat (10).

\* \* \* \* \*